Dec. 31, 1935.　　　P. TROMBETTA　　　2,026,513
ELECTROMAGNETIC BRAKE
Filed Oct. 30, 1934　　　4 Sheets-Sheet 1
FIG. 1
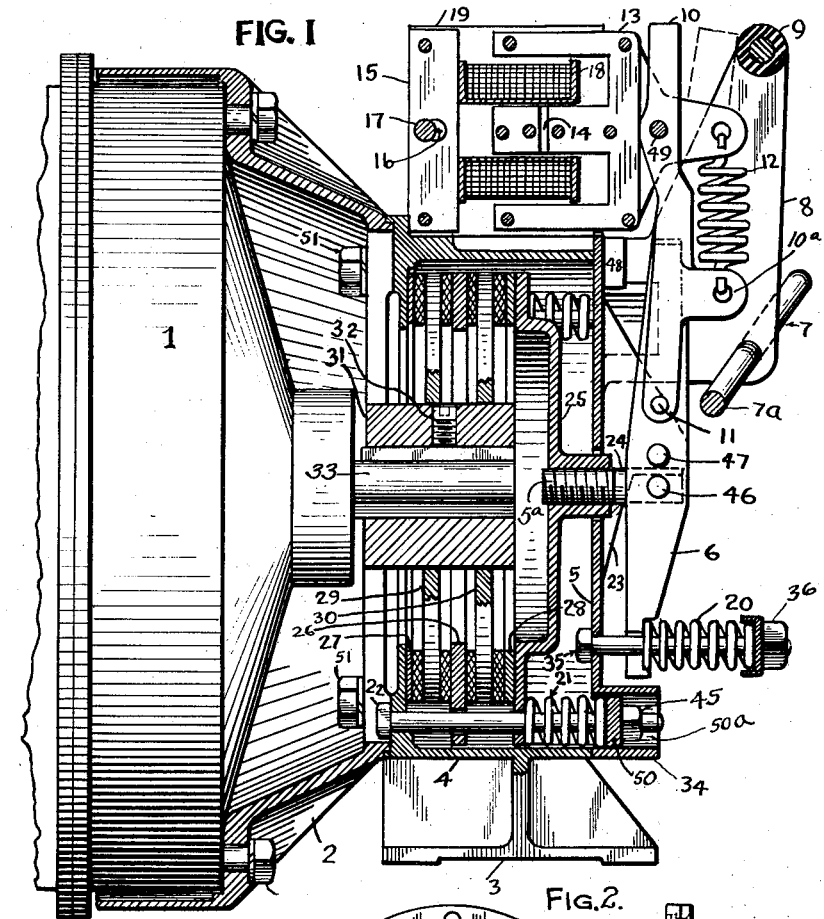
FIG. 2.
FIG. 3
FIG. 4
SECTION 5-5
FIG. 5
SECTION 4-4
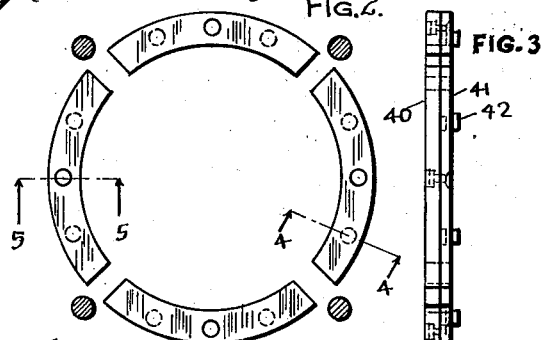
INVENTOR.
PANFILO TROMBETTA
BY
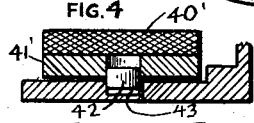
ATTORNEY Dec. 31, 1935.  P. TROMBETTA  2,026,513
ELECTROMAGNETIC BRAKE
Filed Oct. 30, 1934  4 Sheets-Sheet 2

INVENTOR.
PANFILO TROMBETTA
BY *Wiley Muriel*
ATTORNEY

Dec. 31, 1935. P. TROMBETTA 2,026,513
ELECTROMAGNETIC BRAKE
Filed Oct. 30, 1934 4 Sheets-Sheet 3
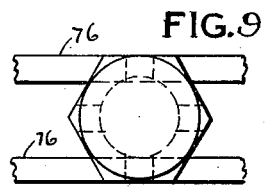
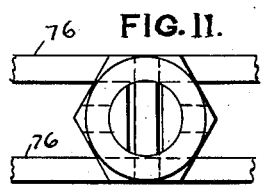
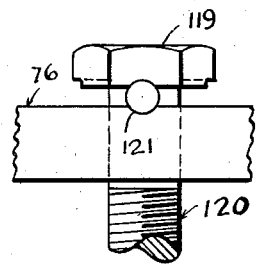
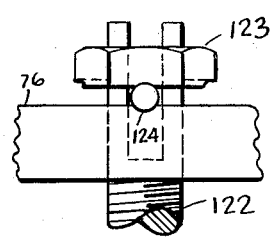
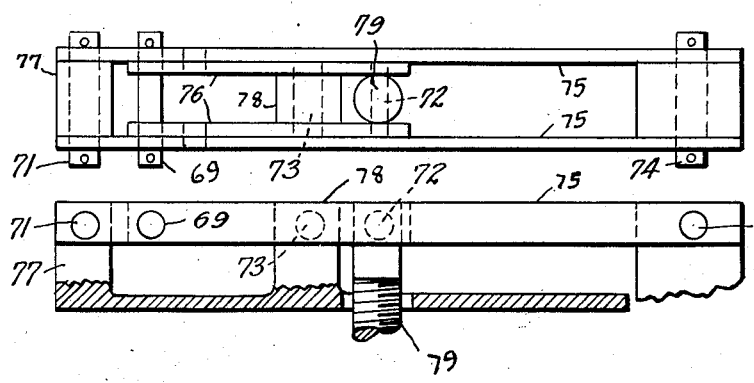
INVENTOR.
PANFILO TROMBETTA
BY
ATTORNEY.

Patented Dec. 31, 1935

REISSUED
JUN 25 1940

2,026,513

UNITED STATES PATENT OFFICE 2,026,513

ELECTROMAGNETIC BRAKE

Panfilo Trombetta, Shorewood, Wis.

Application October 30, 1934, Serial No. 750,654

16 Claims. (Cl. 188—171)

This invention relates to electromagnetically operated devices of the type known as solenoid brakes and magnetic clutches. In a brake, the pressure is generally applied by springs and released by the action of an electromagnetic device of the solenoid or motor type. In a clutch, the pressure is generally applied by an electromagnetic device and released by springs. Since the two types of apparatus are very nearly the same, the term "brake" shall be used for the description of both throughout this specification.

The scope and usefulness of an alternating current solenoid brake is limited by limitations common to alternating current solenoids. One of the principal limitations of an alternating current solenoid is the great amount of current which it draws from the line when in open position, that is, when the solenoid is energized and its plunger is spaced from the pole piece. The current inrush is proportional to the amount of work that the solenoid can do in one stroke, so that it is not desirable to make alternating current solenoids much larger than one that can produce about 300 inch-pounds of work per stroke. Another limitation is the high velocity at which the plunger moves even when under load.

Inherently, therefore, very large solenoid brakes cannot be operated directly by alternating current solenoids, but on the other hand, there is nothing as simple as an alternating current solenoid and therefore their use is most enticing. Medium and small size brakes, when operated by alternating current solenoids, give much trouble due to the high velocity that the plunger attains in moving to the closed or open position when the solenoid is energized or deenergized.

The present invention has as an object to provide electromagnetically operated brakes which will avoid the disadvantages set forth above.

Another object is to provide an electromagnetically operated brake which is relatively simple in construction, easy to adjust, and economical to manufacture.

Another object is to provide an electromagnetically operated brake which is capable of withstanding long and severe service without suffering undue wear on any of its parts except the friction lining.

Another object is to provide an electromagnetically operated brake having provision for the removal and replacement of worn out linings without dismounting the brake or disturbing the adjustment thereof.

Another object is to provide an electromagnetically operated brake which can be removed from its mounting by the removal of two or more pins and without removing the main base which is bolted to the floor.

Another object is to provide a brake which is capable of self alignment in both the vertical and the horizontal planes.

Another object is to provide a brake which is pleasing in appearance and is capable of being mounted either directly upon the end of a motor or upon the floor as a separate unit.

Another object is to provide a brake which is capable of being used in connection with horizontally or vertically operated motors.

Another object is to provide a brake which can be built in any size and for any capacity up to many thousands of foot pounds without resorting to the use of unsuitable operating devices.

Another object is to provide an electromagnetic disc brake with a lever mechanism to enable a long stroke electromagnetic apparatus to operate the brake.

Other objects and advantages will appear from the description hereinafter given of apparatus in which the invention is embodied.

In order to obtain all of the above objects and to meet the exact requirements of industry, it is necessary to subdivide the brakes into two separate and distinct types. One, a totally inclosed brake for duties requiring neatness of appearance and which can be operated in any position and be mounted directly upon the motor. This brake is of the disc type and is not suitable for heavy duty because it cannot dissipate very much heat. The other is a brake of the open type which is capable of dissipating large amounts of heat generated during heavy duty operation such as use upon cranes, hoists, steel mill machinery etc.

The mode of operation of these two types of brakes is very nearly the same and therefore a full explanation of one will suffice for both.

The invention is exemplified by the apparatus illustrated in the accompanying drawings in which the views are as follows:

Fig. 1 is a sectional view of a disc brake which is shown mounted directly upon the end of a horizontally mounted motor, the section being taken on the line 1—1 of Fig. 6. The brake is shown provided with a foot for mounting it upon the floor, but it is to be understood that the foot will be omitted when the brake is mounted directly upon the motor.

Figs. 2 and 3 are a front and an edge view of a complete brake lining holder which is preferably divided into as many segments as there are spring bolts employed in the brake in order that the lining may be renewed without disassembling the brake. As shown, the brake is provided with four spring bolts and the brake lining holder is divided into four segments each of which extends through an angular distance somewhat less than 90° in order to allow it to pass the spring bolts when renewing the lining. The brake lining holder may be made as a single circular unit if desired, in which case the brake must be partly disassembled when renewing the linings.

Fig. 4 is a detail view in cross section taken in the plane of the line 4—4 of Fig. 2 and showing the protruding pieces on the brake lining holder to keep it from sliding under load.

Fig. 5 is a section on the line 5—5 of Fig. 2 and shows the way the lining is riveted on the holder.

Figs. 9, 10, 11 and 12 are detail views showing two ways to take up the wear on the lining.

Figs. 13 and 13A are views showing another construction of a double lever system used in connection with these brakes.

Figure 14:
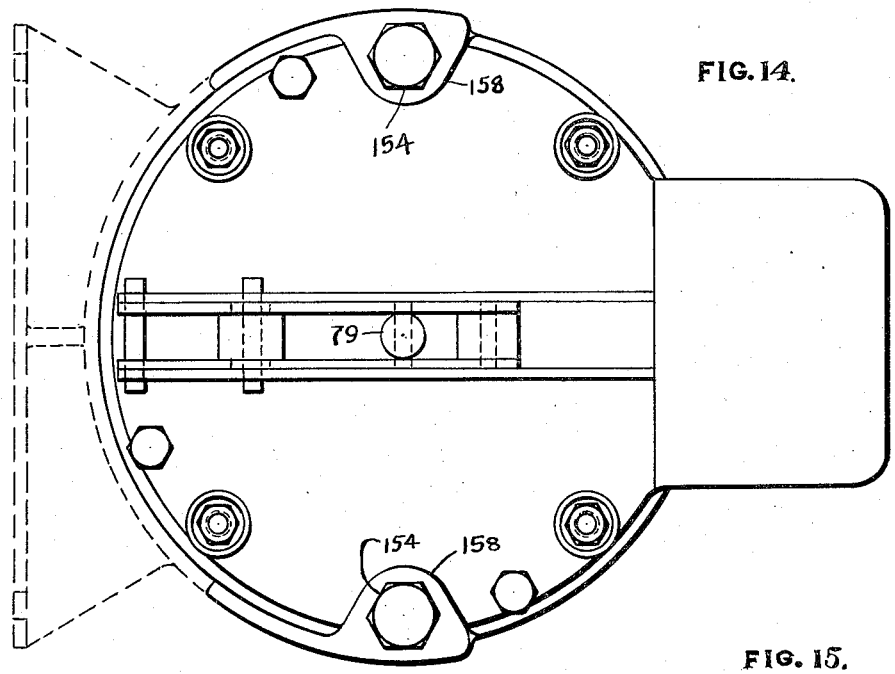
Figure 15:
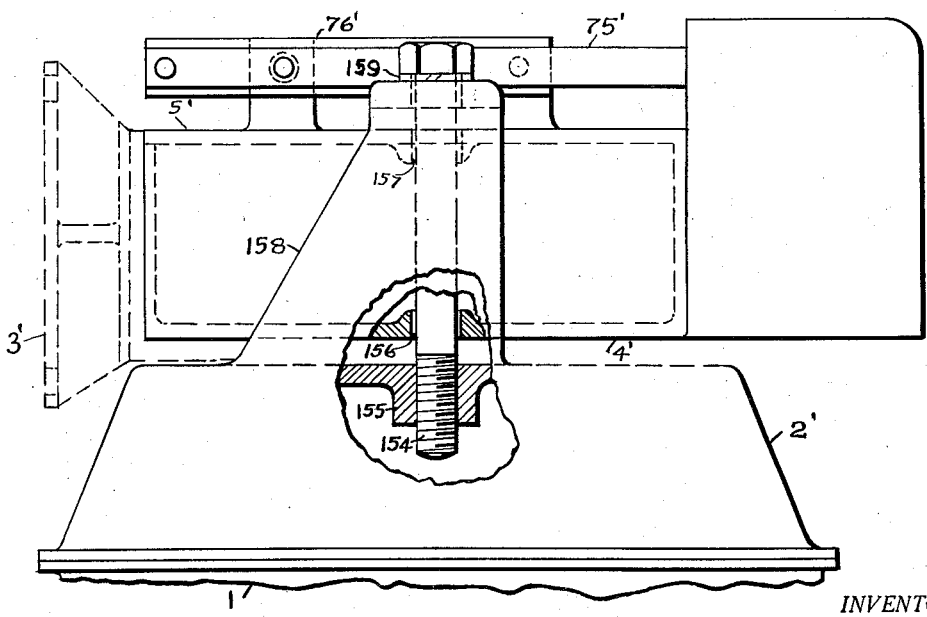

Fig. 14 is an end view and Fig. 15 is a side view of another embodiment of my invention in which the entire brake is supported by and floats upon two or more studs fastened to the casing of the motor upon which the brake is mounted. In this embodiment, brake discs may be rigidly fastened to the motor shaft since any axial movement of the shaft is compensated for by movement of the entire brake along the studs. This type of brake is intended for heavy duty operation and is preferably employed where the use of a wide faced brake wheel is essential in order to facilitate the dissipation of heat. If very large amounts of heat are to be dissipated, the brake is provided with an open casing instead of a closed casing as shown.

Figs. 1 to 6

In Fig. 1, a disc brake is shown mounted upon a motor 1 by means of an adapter casting 2. The adapter 2 is entirely separate from the motor and from the brake casting 4. When the brake is to be mounted upon the floor, a foot 3 is cast integral with, or in some cases separate from the brake casting 4. When the foot is made in a separate casting, the brake is mounted on it in a manner similar to the way it is mounted on the adapter casting. A cover or bridge 5 is bolted to the casting 4 by means of three or four machine screws not shown in the drawings.

Figure 6:
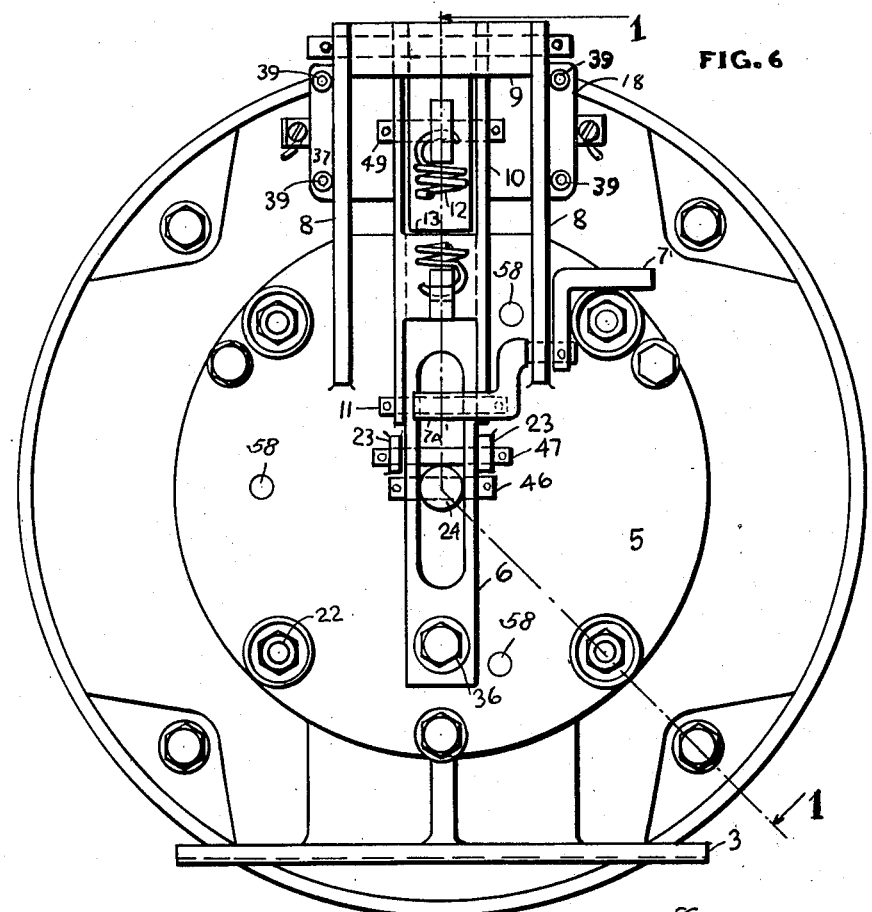
Fig. 6 is an end view of the brake shown in Fig. 1.

The brake mechanism consists of a friction lining holder 27 to which is riveted a lining 40, a rotating steel disc 29, another friction lining holder 26 having a friction lining attached to each side thereof; another rotating steel disc 30 and another lining holder 28 to which is also attached a friction lining. This forms what is known as a double disc brake. On top of all this is what is known as the pressure bell 25. On the top of the pressure bell is a set of 2 or 4 springs 21 held tightly against the pressure bell by bolts 22. Thus the rotating discs 29 and 30 are compressed between the four friction linings by the springs 21. As shown in Figs. 1 and 6, the bell 25 is provided with a threaded boss having a stud 24 threaded therein and extending through a slot formed in a lever 6 which is connected to the stud 24 by a pin 46. The lever 6 is arranged between two posts 23 which are fastened to or formed integral with the bridge 5 and to which the lever 6 is pivoted by means of a pivot pin 47.

The lever 6 has its upper end arranged between the two arms or sides of a bifurcated lever 10 which has its lower end connected to the lever 6 by a pin 11 and its upper end arranged behind or to the left of a stop or shock absorber 9 arranged between and fastened to two plates 8 which extend outward from the bridge 5 and are fixed thereto or formed integral therewith.

The lever 10 intermediate its ends is connected by a pin 49 to the armature 13 of a solenoid which has its frame attached to the bridge 5 and is of the movable pole piece type described in my copending application Serial No. 738,571, filed August 6, 1934.

The outer end of the armature 13 extends between and beyond the arms of the lever 10 and is connected by a spring 12 to a lug 10ª which connects the two arms of the lever 10 to each other and overlies the upper end of the lever 6.

The arrangement is such that the lever 10 is free to swing to the right without operating the lever 6 but, when it is swung to the left by the solenoid, the lug 10ª will engage the upper end of the lever 6 and swing it to the left to release the brake.

As shown, the lever 6 extends below the stud 24 and encircles a bolt 35 which extends through the bridge 5 and has a nut 36 threaded upon its outer end and a spring 20 encircling it between the nut 36 and the lever 6. The pressure of the spring 20 is transmitted to the pressure bell by the lever 6, pin 46 and stud 24 so that the spring pressure may be applied either directly by the springs 21 or through the lever system by spring 20 or by both sets of springs jointly.

The operation of the brake is as follows: When the solenoid is energized the plunger 13 is attracted to the left until it touches the pole piece 15. When pole piece 15 is struck by armature 13 it recedes to the left by reason of the elongated hole 16 until the lever 10 strikes a shock absorber 48 which is arranged upon the bridge 5 and made of a suitable slightly resilient material. Both the lever 10 and the plunger 13 must then come to a stop and the energy stored in the moving plunger 13 and the arm 10 is dissipated in shock absorber 48. By this time the pole piece 15 is adhering tightly to the ends of the plunger 13 and the springs of the brake pull lever 10, armature 13 and pole piece 15 to the right until pole piece 15 is stopped by the pin 17.

When the solenoid is deenergized the springs 20 and/or 21 cause the lever 10 and the plunger 13 to fly back to the right. When the discs are compressed the lever 6 cannot move farther to the right but lever 10 due to the speed which it has acquired and swinging on pin 11 will keep on moving to the right until it is stopped by the shock absorbing device 9. The energy stored in lever 10 and armature 13 is, therefore, absorbed by shock absorber 9 and is not reflected back to the pressure bell 25. In this way is avoided a shock or jerk which would be caused by such reflected blow on stud 24 and bell 25.

The lever ratio of this brake is the ratio of the distance between pins 47 and 49 divided by the distance between pins 46 and 47.

The spring 12 has nothing to do with the brake pressure but is used to balance the weight of armature 13 so that this weight will not bear upon the armature guide 19.

As the linings wear the arm 10 will move farther and farther to the right until it will actually touch 9 and then the brake will begin to slip. In order to readjust the brake it is necessary to remove pin 46 and unscrew stud 24 an amount equivalent to the total wear on lining.

The torque of the brake is taken entirely by the bolts 22 of which sometimes there are 4 and sometimes only 2. The use of only two bolts and two springs makes it easier to remove worn out linings and replace new ones. Thus when only two bolts are used the removable rings shown in Fig. 2 have to be cut into segments of 180° while if four bolts are used they have to be cut into segments of 90°. The bolts 22 float on casting 4 and cup washer 50 which fits over the spring 21 and inside the spring housing 50A.

In order to allow axial movements of the motor shaft the discs 29 and 30 float on hub 31 which is rigidly fastened and keyed to the shaft 33.

The hub 31 in one of the embodiments of my invention is made of square cross section and fits into a square hole in discs 29 and 30.

In Fig. 1 the stationary friction lining holder 26 is shown with the lining riveted directly on it but it may be provided with recesses similar to those provided on the bottom of casing 4 and on the bottom of pressure bell 25 to admit the replaceable units shown in Fig. 2.

Figure 8:
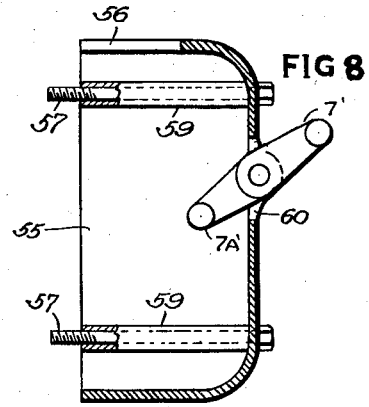
Fig. 8 is a vertical section through a cover for disc brakes such as that shown in Fig. 1, the hand release lever being mounted on the cover instead of on the bridge casting as shown in Fig. 1.

In order to make it possible to release the brake by hand, a hand release lever 7 is provided. This lever shown in its preferred form mounted on bridge 5 in Figs. 1 and 6 is sometimes mounted on the overall cover of the brake as shown in Fig. 8. The operation of the lever in both cases is as follows: When the uppermost part of this lever is pressed downward the lower part 7a impinges on lever 6 and pushes it to the left and thereby performs the same function as the solenoid when it is energized.

In accordance with the embodiment of my invention shown in Fig. 1 the solenoid is made of the E type. These solenoids are more suitable for short strokes and when made to seal on all of the three legs are the most quiet solenoids that can be made.

According to the prior art these solenoids are made to seal only on the outer legs leaving the middle leg with an air gap between it and the pole piece 15. A gap between the pole piece and the middle leg is the cause of much chattering and noise, so much so that when these solenoids are made according to the prior art they are even more difficult to make quiet than the ordinary solenoid. Therefore the use of a solenoid with a gap in the middle leg and sealing on all the three legs represents a great advancement in brake design especially when quietness of operation is desired.

This is accomplished by dividing the middle leg of the armature into two sections which are separated from each other by an air gap 14, as shown in Fig. 1. The armature consists of a stack of E-shaped laminations, a stack of short laminations arranged in alinement with but spaced from the middle leg of the E-shaped laminations, and two heavy E-shaped non-magnetic plates between which all of the laminations are riveted and which bridges the gap 14 to hold the short laminations in position. The end laminations are made as short as possible but long enough to receive two rivets which keep them in alinement. If the armature is very thick, it is ordinarily provided with a third heavy E-shaped plate which extends through both stacks of laminations midway between the two outer plates.

Figure 7:
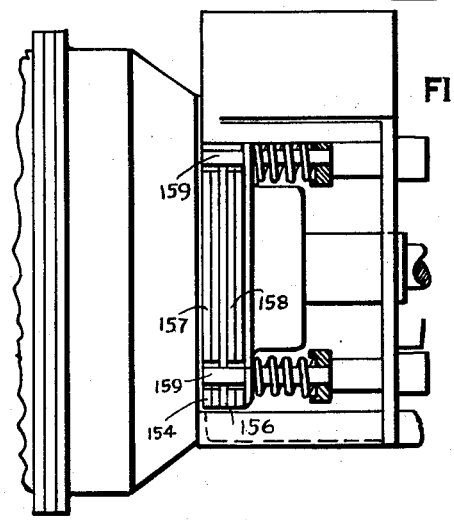
Fig. 7 is a side view showing the brake casting of the brake shown in Fig. 1 provided with openings through which the brake lining holder segments may be removed and replaced.

In order to make it possible for the removal of worn out linings and the replacement of new ones the brake housing 4 is made with suitable openings on each side, as shown on Fig. 7.

Each of the renewable friction lining units 10 shown in Figs. 2, 3, 4 and 5 consists of a lining 40 and a lining carrier 41 and ordinarily extends through an angular distance somewhat less than the angular distance between adjacent spring bolts. The carrier 41 has the lining 40 riveted to one face thereof by countersunk rivets 44 and the other face thereof provided with projections 42 to fit into recesses 43 formed in the inner end wall of the casing 4 and in the lining holders 26, 27 and 28. As shown, the projections 42 are formed by partially punching out small sections of the carrier 41.

When the brake is provided with a lever mechanism of the simple lever type as shown in Figs. 1 and 6, it is not ordinarily possible to obtain a lever ratio greatly in excess of 8 to 1 without making the brake clumsy and out of aesthetic proportions. This ratio is sufficient only when a very short-stroke solenoid is employed.

In actual practice, it is found that the lever mechanism must have a much greater ratio which can be obtained by using a compound lever mechanism such as that shown in Figs. 13 and 13A.

This lever mechanism consists primarily of a double outer lever 75 and a double inner lever 76 arranged between the two sides thereof. The lever 75 has its right end connected by a pin 74 to an electromagnetic apparatus, such as the armature 13, and its left end straddling and pivoted by a pin 71 to a stationary post 77 which is carried by the frame or casing of the brake and corresponds to the two posts 8 shown in Fig. 1.

The lever 76 straddles and is pivoted intermediate its ends by a pin 73 to a stationary post 78 which is carried by the frame or casing of the brake and corresponds to the post 23 shown in Fig. 1. The left end of the lever 76 is pivoted by a pin 69 to the lever 75 near the pin 71. The right end of the lever 76 straddles and is connected by a pin 72 to a stud 79 which is connected to the pressure member of the brake and corresponds to the stud 24 shown in Fig. 1.

When the right end of the lever 75 is pulled downward in respect to Fig. 13A by the electromagnetic apparatus, the pin 69 moves the left end of the lever 76 downward and thereby causes the right end thereof to move upward.

By employing compound levers, ratios up to 70 to 1 may be obtained for medium size brakes and up to 120 to 1 for large brakes.

Instead of connecting the stud 79 to the lever 76 by means of pin 72 as shown in Figs. 13 and 13A, the stud may be provided upon its outer end with a nut which is pivoted upon the outer edges or top of the lever 76, as shown in Figs. 9 to 12.

In Figs. 9 and 10, the stud is indicated by the reference numeral 120 and shown provided with a nut 119 having a plurality of grooves formed in its under face to be engaged by two arcuate projections or bearings which are fastened upon the upper edges of the lever 76.

In Figs. 11 and 12, the stud is indicated by the reference numeral 122 and shown as having its upper end slotted and a nut 123 threaded thereon. The nut 123 has a plurality of grooves formed in its underface to be engaged by a pin 124 which extends through the slotted upper end of the stud and bears upon the upper edges of the lever 76.

In either case, the brake may be adjusted by turning the nut 119 or 123, the brake springs permitting the nut to rise and fall as the grooves pass into and out of alinement with the projections 121 or the pin 124. After adjustment is made, the grooves prevent the nut from being turned accidently.

In Fig. 7 is shown a side view of the same brake shown in Fig. 1 in order to show the openings at the side for the purpose of removing the removable lining holder units shown in Fig. 2. Many of the parts of the brake are left out for the sake of clarity. In this case the brake has four springs and spring bolts and the removable units are made in segments of less than 90° so that they can pass between the bolts 159. This particular model is provided with only two openings although more may be provided if desirable. In this case the upper and lower segments must be slid around the circumference until they come in front of the openings. Sometimes the brake is made with only two segments placed diametrically opposite each other. This is possible in case of very light duty brakes where the wearing of the lining is of no consequence.

Fig. 8 shows in cross-section a removable cover which is sometimes employed to cover the brake mechanism to improve the appearance thereof and in the interest of safety.

The cover consists primarily of a hollow cast iron body 55 which is sometimes made large enough to cover the entire mechanism including the solenoid. At other times it is made substantially the same size as bridge 5 in which case it has a slot 56 formed in its side wall to clear plates 8 and lever 10, and a separate cover is arranged over the solenoid.

The cover may be fixed in position in any suitable manner such as by means of bolts 57 each of which extends through the top of body 55 and is threaded into holes 58 formed in bridge 5. Each bolt 57 has a tubular separator 59 arranged thereon to space the cover from bridge 5.

In order that the brake may be manually released when the cover is in position, a release lever 7' is pivoted to the end wall of the cover and extends through a slot 60 formed therein. Lever 7' is substantially the same as lever 7 and is provided upon its inner end with an arm 7A to depress lever 6 when lever 7' is swung upon its pivot.

Figs. 14 and 15 disclose another method of mounting the brake shown in Figs. 1 to 6. This method differs from the previously described method in that the rotatable friction disk is fixed to the rotatable member or motor shaft, instead of being splined thereon as in Fig. 1, and the brake casing is mounted upon stationary guides which permit the entire brake to float and thereby compensate for end play of the rotatable member or motor shaft and which permit the rotatable and nonrotatable disks to move axially relative to each other as the brake is applied and released.

As shown, the adapter casting 2 of Fig. 1 is replaced by an adapter casting 2' having two diametrically opposed arms 158 which are flanged at the free ends thereof. The brake frame or casting 4 is arranged between the arms 158 and retained in position therebetween by two bolts 154 each of which extends through the flanged outer end of an arm 158 and through the casting 4 and is threaded into a boss 155 formed on the adapter casting 2' alongside the arm 158.

Each bolt 154 is closely fitted in two holes 156 and 157 formed in the end walls of the casting 4 so that the entire brake is free to move axially or to float upon the bolts 154 but is restrained from rotation thereby.

For the purpose of illustration, the brake is shown provided with the compound lever mechanism disclosed in Fig. 13 but it may as readily be provided with a different type of lever mechanism as shown in Figs. 1 and 6.

The invention herein set forth is susceptible of various modifications and adaptations without departing from the scope thereof as hereafter claimed. The invention is hereby claimed as follows:

1. An electromagnetic brake for a rotatable member, comprising a stationary frame, a non-rotatable braking element arranged within said frame and restrained from movement relative thereto, a second non-rotatable braking element slidable within said frame and restrained from rotation thereby, a rotatable braking element arranged between said non-rotatable elements and connected to said rotatable member to rotate therewith, spring means for applying said brake, a single pressure member for transmitting the pressure of said spring means to said braking elements to force all of them together, a lever mechanism connected to said pressure member and pivoted to said frame for relieving said pressure member from the pressure of said spring means, a single solenoid attached to said frame and having its armature connected to said lever mechanism to operate the same, and spring means for supporting a part of the weight of said armature to thereby prevent excessive wear on said solenoid upon said brake being arranged in such a position that the axis of said solenoid is horizontal.

2. An electromagnetic brake for a rotatable member, comprising a stationary frame, a non-rotatable braking element arranged within said frame and restrained from movement relative thereto, a second non-rotatable braking element slidable within said frame and restrained from rotation thereby, a rotatable braking element arranged between said non-rotatable elements and connected to said rotatable member to rotate therewith, spring means for applying said brake, a single pressure member for transmitting the pressure of said spring means to said braking elements to force all of them together, a lever mechanism connected to said pressure member and pivoted to said frame for relieving said pressure member from the pressure of said spring means, a single electromagnetic apparatus for operating said lever mechanism and including a magnet and an armature one of which is attached to said frame and the other of which is connected to said lever mechanism at one end thereof to operate it in a direction to release said brake, and a spring connected to said lever mechanism at the other end thereof to apply pressure to said pressure member.

3. An electromagnetic brake for a rotatable member, comprising a stationary frame, a non-rotatable braking element arranged within said frame and restrained from movement relative thereto, a second non-rotatable braking element slidable within said frame and restrained from rotation thereby, a rotatable braking element arranged between said non-rotatable elements and connected to said rotatable member to rotate therewith, spring means for applying said brake, a single pressure member for transmitting the pressure of said spring means to said braking elements to force all of them together, a lever mechanism connected to said pressure member and pivoted to said frame for relieving said pressure member from the pressure of said spring means, a single electromagnetic apparatus for operating said lever mechanism and including a magnet and an armature one of which is attached to said frame and the other of which is connected to said lever mechanism, a removable cover arranged upon said frame over said lever mechanism, a pivot carried by said cover, and a hand release lever carried by said pivot and operable from the outside of said cover to engage said lever mechanism and operate it to relieve said pressure member from the pressure of said spring means.

4. An electromagnetic brake as set forth in claim 1, characterized by said frame having a lateral opening therein, said non-rotatable braking elements having a plurality of segmental brake lining carriers held against rotation thereon and readily removable radially therefrom through said opening, and each of said carriers having a facing of brake lining material fixed to one side thereof.

5. An electromagnetic brake as set forth in claim 1, characterized by the lever mechanism including a compound lever to obtain a very large lever ratio between said electromagnetic means and said pressure member.

6. An electromagnetic brake for a rotatable member, comprising a stationary casing, a non-rotatable braking element arranged within said casing and restrained from movement relative thereto, a second non-rotatable braking element slidable within said casing and restrained from rotation thereby, a rotatable braking element arranged between said non-rotatable elements and connected to said rotatable member to rotate therewith, a single pressure member slidable within said casing for transmitting pressure to said braking elements to force the same together, a plurality of springs acting upon said pressure member for applying pressure thereto and having the axes thereof parallel to the direction of movement of said pressure member, a lever mechanism connected to said pressure member and pivoted to said casing for relieving said pressure member from the pressure of said springs, a solenoid having its frame attached to said casing and its armature slidable in said frame and connected by a pivot to said lever mechanism to operate the same upon said solenoid being energized, and a spring having one of its ends connected to said lever mechanism and its other end connected to said armature at a point outward from said pivot to prevent said armature from binding in said frame and to avoid undue wear of said solenoid when said brake is arranged in such a position that said solenoid is horizontal.

7. The combination, with a shaft rotatable in a stationary casing, of an electromagnetic brake comprising a plurality of supports fixed to said casing, a frame slidable upon said supports and restrained from rotation thereby, a non-rotatable braking element arranged within said frame and restrained from movement relative thereto, a second non-rotatable braking element slidable within said frame and restrained from rotation thereby, a brake disk fixed on said shaft to rotate therewith and restrained from movement axially thereof, spring means for applying said brake, a pressure member for transmitting the pressure of said spring means to said braking elements to force all of them together, a lever mechanism connected to said pressure member and pivoted to said frame for relieving said pressure member from the pressure of said spring means, and electromagnetic means for operating said lever mechanisms to relieve said braking elements from the pressure of said spring means.

8. The combination, with a shaft rotatable in a stationary casing, of an electromagnetic brake comprising a plurality of supports fixed to said casing, a frame slidable upon said supports and restrained from rotation thereby, a non-rotatable braking element arranged within said frame and restrained from movement relative thereto, a second non-rotatable braking element slidable within said frame and restrained from rotation thereby, a brake disk fixed on said shaft to rotate therewith and restrained from movement axially thereof, spring means for applying said brake, a single pressure member for transmitting the pressure of said spring means to said braking elements to force all of them together, a lever mechanism connected to said pressure member and pivoted to said frame for relieving said pressure member from the pressure of said spring means, and a single electromagnetic apparatus for operating said lever mechanism and including a magnet and an armature one of which is attached to said frame and the other of which is connected to said lever mechanism.

9. An electromagnetic brake as set forth in claim 7, characterized by the lever mechanism including a compound lever to obtain a very large lever ratio between said electromagnetic means and said pressure member.

10. The combination, with a rotatable member, of a disk brake comprising a casing having rear and side walls extending around said member and a front wall extending across its side wall, two non-rotatable braking elements arranged within said casing and restrained from rotation relative thereto, a rotatable braking element arranged between said non-rotatable elements and connected to said rotatable member to rotate therewith, a non-rotatable pressure element arranged within said casing to transmit spring pressure to said braking elements, a plurality of bolts arranged around the outside of said rotatable element and extending through said rear wall and through at least one of said non-rotatable elements to take the torque thereof during application of said brake, each of said bolts being restrained by said front and rear walls from movement transverse to the bolt axis, an abutment fixed upon the front end of each bolt, a compression spring encircling each bolt between said abutment and said pressure element for forcing said braking elements together to thereby apply said brake, a lever mechanism connected to said pressure element and pivoted to said casing for retracting said pressure element to thereby relieve said braking elements from the pressure of said springs, and a single electromagnetic apparatus for operating said lever mechanism and including a magnet and an armature one of which is fixed in a stationary position in respect to said casing and the other of which is connected to said lever mechanism.

11. The combination, with a rotatable member, of a disk brake comprising a casing having rear and side walls extending around said member and a front wall extending across its side wall, two non-rotatable braking elements arranged within said casing and restrained from rotation relative thereto, a rotatable braking element arranged between said non-rotatable elements and connected to said rotatable member to rotate therewith, a non-rotatable pressure element arranged within said casing to transmit spring pressure to said braking elements, a plurality of bolts arranged around the outside of said rotatable element and extending through said rear wall and through at least one of said non-rotatable elements to take the torque thereof during application of said brake, each of said bolts being restrained by said front and rear walls from movement thansverse to the bolt axis, an abutment fixed upon the front end of each bolt, a compression spring encircling each bolt between said abutment and said pressure element for forcing said braking elements together to thereby apply said brake, a lever mechanism connected to said pressure element and pivoted to said casing for retracting said pressure element to thereby relieve said braking elements from the pressure of said springs, and a solenoid having its frame fixed in a stationary position in respect to said casing and its armature connected directly to said lever mechanism to operate the same upon said magnet being energized.

12. The combination, with a rotatable member, of a disk brake comprising a casing having rear and side walls extending around said member and a front wall extending across its side wall, two non-rotatable braking elements arranged within said casing and retrained from rotation relative thereto, a rotatable braking element arranged between said non-rotatable elements and connected to said rotatable member to rotate therewith, a non-rotatable pressure element arranged within said casing to transmit spring pressure to said braking elements, a plurality of bolts arranged around the outside of said rotatable element and extending through said rear wall and through at least one of said non-rotatable elements to take the torque thereof during application of said brake, a plurality of sockets fixed to said front wall, an abutment fixed upon the front end of each bolt and arranged in one of said sockets, a compression spring encircling each bolt between said abutment and said pressure element for forcing said braking elements together to thereby apply said brake, a lever mechanism connected to said pressure element and pivoted to said casing for retracting said pressure element to thereby relieve said braking elements from the pressure of said springs, and a single electromagnetic apparatus for operating said lever mechanism and including a magnet and an armature one of which is fixed in a stationary position in respect to said casing and the other of which is connected to said lever mechanism.

13. In a disk brake having a plurality of flat braking elements arranged around a shaft to exert a braking force thereon, the combination of a plurality of segmental brake lining units each comprising a backing member and a friction member arranged upon one of said elements, and means for attaching said backing members to that element to be readily removable radially therefrom without removing any of said elements from said shaft.

14. In a brake having rotatable and non-rotatable braking elements arranged around a shaft to exert a braking force thereon, the combination of a plurality of segmental brake lining units each comprising a backing member and a friction member arranged upon the non-rotatable elements, and means for attaching said backing members to said elements to be readily removable therefrom without removing any of said elements from said shaft.

15. In a disk brake for a shaft, the combination of a plurality of flat braking elements arranged around said shaft, one of said elements having a plurality of sockets arranged therein, a plurality of segmental brake lining units arranged between the socketed element and the adjacent element, each of said units comprising a backing member and a friction member, and a plurality of projections carried by said backing members and inserted into said sockets to restrain said units from movement relative to said socketed element but permitting them to be readily removed radially from between said elements.

16. In a brake having a frame, rotatable and non-rotatable braking elements arranged within said frame, spring means for urging said elements together to apply the brake, lever mechanism for releasing the brake against the action of said spring means, and electromagnetic means for operating said lever mechanism, the combination of a hollow cover arranged upon said frame over said lever mechanism, and means carried by said cover and operable manually from the outside thereof to operate the lever mechanism inside said cover to release the brake.

PANFILO TROMBETTA.